United States Patent
Howie et al.

(10) Patent No.: US 8,755,148 B1
(45) Date of Patent: Jun. 17, 2014

(54) DISK DRIVE WITH BALANCE PLUG HAVING LONGITUDINAL RETAINERS

(71) Applicant: Western Digital Technologies, Inc., Irvine, CA (US)

(72) Inventors: Joshua B. Howie, Fort Collins, CO (US); Joshua P. Weiher, San Jose, CA (US); Scott E. Watson, San Jose, CA (US); Matthew L. Brown, Palo Alto, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/733,750

(22) Filed: Jan. 3, 2013

Related U.S. Application Data

(62) Division of application No. 12/826,667, filed on Jun. 30, 2010, now Pat. No. 8,369,044.

(51) Int. Cl.
*G11B 17/02* (2006.01)

(52) U.S. Cl.
USPC ............................................. 360/99.12

(58) Field of Classification Search
None
See application file for complete search history.

(56) References Cited

U.S. PATENT DOCUMENTS

| | | |
|---|---|---|
| 3,917,271 A | 11/1975 | Lemelson et al. |
| 4,919,422 A | 4/1990 | Ma |
| 5,130,870 A | 7/1992 | Jabbari |
| D544,931 S | 10/1993 | Evangelista |
| 5,284,391 A | 2/1994 | Diel et al. |
| 5,422,776 A | 6/1995 | Thorson et al. |
| 5,621,588 A | 4/1997 | Williams et al. |
| 6,178,062 B1 | 1/2001 | Yim et al. |
| 6,504,673 B2 | 1/2003 | Choo et al. |
| 6,550,328 B1 | 4/2003 | Horning et al. |
| 6,741,418 B2 | 5/2004 | Renken |
| 6,754,042 B1 | 6/2004 | Chiou et al. |
| 6,807,721 B2 | 10/2004 | Choo et al. |
| 6,915,527 B2 | 7/2005 | Liao et al. |
| 6,947,253 B2 | 9/2005 | Pfeiffer et al. |
| 7,064,923 B2 | 6/2006 | Tran et al. |
| 7,102,850 B1 | 9/2006 | Buzek et al. |
| D340,489 S | 6/2007 | Laliberty et al. |
| 7,295,400 B2 | 11/2007 | Tran et al. |
| 7,307,813 B1 | 12/2007 | Suwito |
| 7,342,746 B1 | 3/2008 | Lin |
| 7,463,446 B2 | 12/2008 | Elsing |
| 7,529,064 B1 | 5/2009 | Huang et al. |
| 7,602,583 B2 | 10/2009 | Makita |
| 7,630,171 B2 | 12/2009 | Lee et al. |
| 8,369,044 B2 | 2/2013 | Howie et al. |
| 8,437,101 B1 | 5/2013 | German et al. |
| 2005/0108743 A1 | 5/2005 | Kawamura |
| 2006/0096934 A1* | 5/2006 | Weinberger et al. .......... 210/791 |
| 2007/0263321 A1 | 11/2007 | Chan et al. |
| 2008/0024925 A1 | 1/2008 | Shikano |
| 2008/0032834 A1 | 2/2008 | Krysiak |
| 2008/0037165 A1 | 2/2008 | Nguyen et al. |
| 2012/0002324 A1 | 1/2012 | Howie et al. |

OTHER PUBLICATIONS

Notice of Allowance dated Oct. 5, 2012 from U.S. Appl. No. 12/826,667, 16 pages.

\* cited by examiner

*Primary Examiner* — David D Davis

(57) ABSTRACT

Described herein is a disk drive balance plug that includes a substantially cylindrical body defining a first end, a second end, a substantially cylindrical outer surface, and a plug central axis. The balance plug also preferably includes at least one protrusion extending along the cylindrical outer surface between the first and second ends in a direction substantially aligned with the plug central axis.

10 Claims, 4 Drawing Sheets

DISK DRIVE WITH BALANCE PLUG HAVING LONGITUDINAL RETAINERS

CROSS-REFERENCE TO RELATED APPLICATIONS

This application is a divisional application of U.S. patent application Ser. No. 12/826,667, filed on Jun. 30, 2010, entitled "DISK DRIVE WITH BALANCE PLUG HAVING LONGITUDINAL RETAINERS," the disclosure of which is hereby fully incorporated by reference.

BACKGROUND

Hard disk drives, (HDD) are often used in electronic devices, such as computers, to record data onto or to reproduce data from a recording media, which can be a disk having one or more recording surfaces. The HDD also includes a head for reading the data on a recording surface of the disk and for writing data unto one of the surfaces. An actuator is provided for moving the head over a desired location, or track of the disk.

The HDD includes a spindle motor for rotating the disk during operation. When the disk drive is operated, and the actuator moves the head over the disk, the head is floated a predetermined height above the recording surface of the disk while the disk is rotated, and the head detects and/or modifies the recording surface of the disk to retrieve, record, and/or reproduce data from and/or onto the disk.

When the HDD is not in operation, or when the disk is not rotating, the head can be rotated by the actuator to a position such that the head is not over the disk or the recording surfaces. In this non-operational configuration, the head is "parked off" of the recording surface of the disk.

BRIEF DESCRIPTION OF THE DRAWINGS

A general architecture that implements the various features of the disclosure will now be described with reference to the drawings. The drawings and the associated descriptions are provided to illustrate embodiments of the disclosure and not to limit the scope of the disclosure. Throughout the drawings, reference numbers are reused to indicate correspondence between referenced elements.

DETAILED DESCRIPTION

Figure 1:
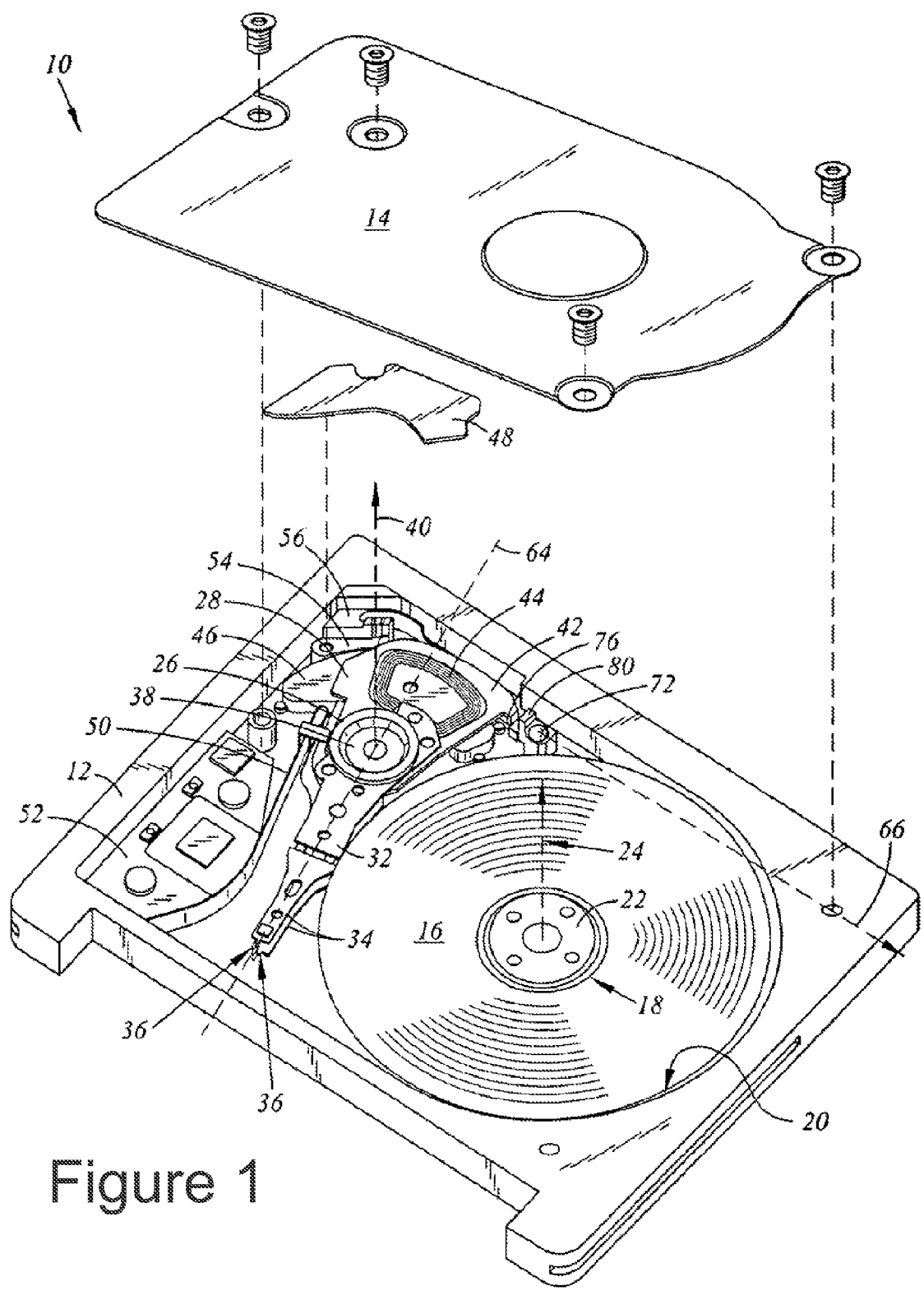
FIG. 1 depicts a perspective view of a disk drive in accordance with one embodiment.

Referring now to FIG. 1, there is depicted an exploded perspective view of a disk drive 10 according to embodiments described herein. The disk drive 10 includes a head disk assembly (HDA) and a printed circuit board assembly (PCBA). The head disk assembly includes a disk drive housing having disk drive housing members, such as a disk drive base 12 and a cover 14. The disk drive base 12 and the cover 14 collectively house at least one disk 16. A single disk or additional disks may be included in the disk drive.

The disk 16 includes an inner diameter (ID) 18 and an outer diameter (OD) 20. The disk 16 further includes a plurality of tracks on its recording surface, or face, for storing data. The disk 16 may be of a magnetic recording type of storage device, however, other arrangements (e.g., optical recording) may be utilized. The head disk assembly further includes a spindle motor 22 for rotating the disk 16 about a disk rotation axis 24. The head disk assembly further includes a head stack assembly 26 rotatably attached to the disk drive base 12 in operable communication with the disk 16. The head stack assembly 26 includes an actuator 28.

The actuator 28 includes an actuator body and at least one actuator arm 32 that extends from the actuator body. Some embodiments include multiple arms 32. Distally attached to the actuator arms 32 are suspension assemblies 34. The suspension assemblies 34 respectively support heads 36. The suspension assemblies 34 with the heads 36 are referred to as head gimbal assemblies. The number of actuator arms and suspension assemblies may vary depending upon the number of disks and disk surfaces utilized.

The head 36 can include a transducer for writing and reading data. The transducer can include a writer and a read element. In magnetic recording applications, the transducer's writer may be of a longitudinal or perpendicular design, and the read element of the transducer may be inductive or magnetoresistive.

In optical and magneto-optical recording applications, the head may also include an objective lens and an active or passive mechanism for controlling the separation of the objective lens from a disk surface of the disk 16. The disk 16 includes opposing disk surfaces. In magnetic recording applications the disk surface typically includes one or more magnetic layers. Data may be recorded along data annular regions on a single disk surface or both.

The head stack assembly 26 may be pivoted such that each head 36 is disposed adjacent to the various data annular regions from adjacent to the outer diameter 20 to the inner diameter 18 of the disk 16. In FIG. 1, the actuator body includes a bore, and the actuator 28 further includes a pivot bearing cartridge 38 engaged within the bore for facilitating the actuator body to rotate between limited positions about an axis of rotation 40.

The actuator 28 can further include a coil support element 42 that extends from one side of the actuator body opposite the actuator arms 32. The coil support element 42 is configured to support a coil 44. A VCM magnet 46 may be supported by the disk drive base 12. Posts may be provided to position the VCM magnet 46 in a desired alignment against the disk drive base 12. A VCM top plate 48 may be attached to an underside of the cover 14. The coil 44 is positioned, in some embodiments, between the VCM magnet 46 and the VCM top plate 48 to form a voice coil motor for controllably rotating the actuator 28.

The head stack assembly 26 can further include a flex cable assembly 50 and a cable connector 52. The cable connector 52 can be attached to the disk drive base 12 and is disposed in electrical communication with the printed circuit board assembly. The flex cable assembly 50 supplies current to the coil 44 and carries signals between the heads 36 and the printed circuit board assembly.

With this configuration, current passing through the coil 44 results in a torque being applied to the actuator 28. The actuator 28 includes an actuator longitudinal axis 64 which extends generally along the actuator arms 32. A change in direction of the current through the coil 44 results in a change in direction of the torque applied to the actuator 28, and consequently, the longitudinal axis 64 of the actuator arms 32 is rotated about the axis of rotation 40. It is contemplated that other magnet, VCM plate, coil and magnet support configurations may be utilized, such as a multiple coil arrangements, single or double VCM plates and a vertical coil arrangement.

The disk drive 10 can also include a latch 54. The latch 54 can include a fixed portion 56 that is firmly coupled to the disk drive base 12. The latch 54 further includes a latching portion that is engagable with fixed portion 56 to limit rotational movement of the actuator 28. Although the latch 54 is depicted as being located in a corner of the base, the latch 54 could be located in other portions of the disk drive and still perform its functions.

When the actuator 28 is rotated into the parked position, as illustrated in FIG. 1, the actuator 28 can include a contact member 76, which can be located on the coil support element 42 or elsewhere, that is configure to engage a crash stop 80 in order to limit rotation of the actuator 28 away from the disk 16. The crash stop 80 can be an integral part of the base 12, or the crash stop 80 can be connected to the base 12 via a fixation element 72. FIG. 1 depicts an axis of engagement 66 of the contact member 76 and the crash stop 80 as being in line with the fixation element 72, but other constructions are also permissible. A crash stop 80 can also be provided to limit movement of the actuator 28 toward the ID 18 of the disk 16.

Data is recorded onto a surface of the disk in a pattern of concentric rings known as data tracks. The disk surface is spun at high speed by means of a motor-hub assembly. Data tracks are recorded onto the disk surface by means of the head 36, which typically resides at the end of the actuator arm 32. One skilled in the art understands that what is described for one head-disk combination applies to multiple head-disk combinations.

The dynamic performance of the HDD is a major mechanical factor for achieving higher data capacity as well as for manipulating the data faster. The quantity of data tracks recorded on the disk surface is determined partly by how well the head 36 and a desired data track can be positioned relative to each other and made to follow each other in a stable and controlled manner. There are many factors that can influence the ability of the HDD to perform the function of positioning the head 36 and following the data track with the head 36. In general, these factors can be put into two categories; those factors that influence the motion of the head 36; and those factors that influence the motion of the data track. Undesirable motions can come about through unwanted vibration and undesirable tolerances of components.

During development of the HDD, the disk 16 and head 36 have undergone reductions in size. Much of the refinement and reduction has been motivated by consumer request and demand for more compact and portable hard drives 10. For example, the original hard disk drive had a disk diameter many times larger than those being developed and contemplated.

Smaller drives often have small components with relatively very narrow tolerances. For example, disk drive heads 36 are designed to be positioned in very close proximity to the disk surface. Due to the tight tolerances, vibration activity of the actuator arm 32 relative to the disk 16 can adversely affect the performance of the HDD. For example, vibration of the actuator 28 can result in variations in the spacing between the head element and media. Additionally, irregular movement of the disk 16, or vibrations caused by unbalanced rotations, can result in variations in the spacing between the head element and the disk 16, or media.

In addition, as disk drive tracks per inch (TPI) increases, sensitivity to small vibrations also increases. Small vibrations can cause significant off-track and degraded performances. For example, in many cases, variations in the spacing between the head element and media can increase the off-track complications, and the increase in TPI compounds the complications and likely gives rise to data errors. These data errors can include both hard errors during writing and soft errors during reading. Moreover, vibration-induced errors become even more apparent as the actual offset distances and overall components are reduced in size.

Figure 2:
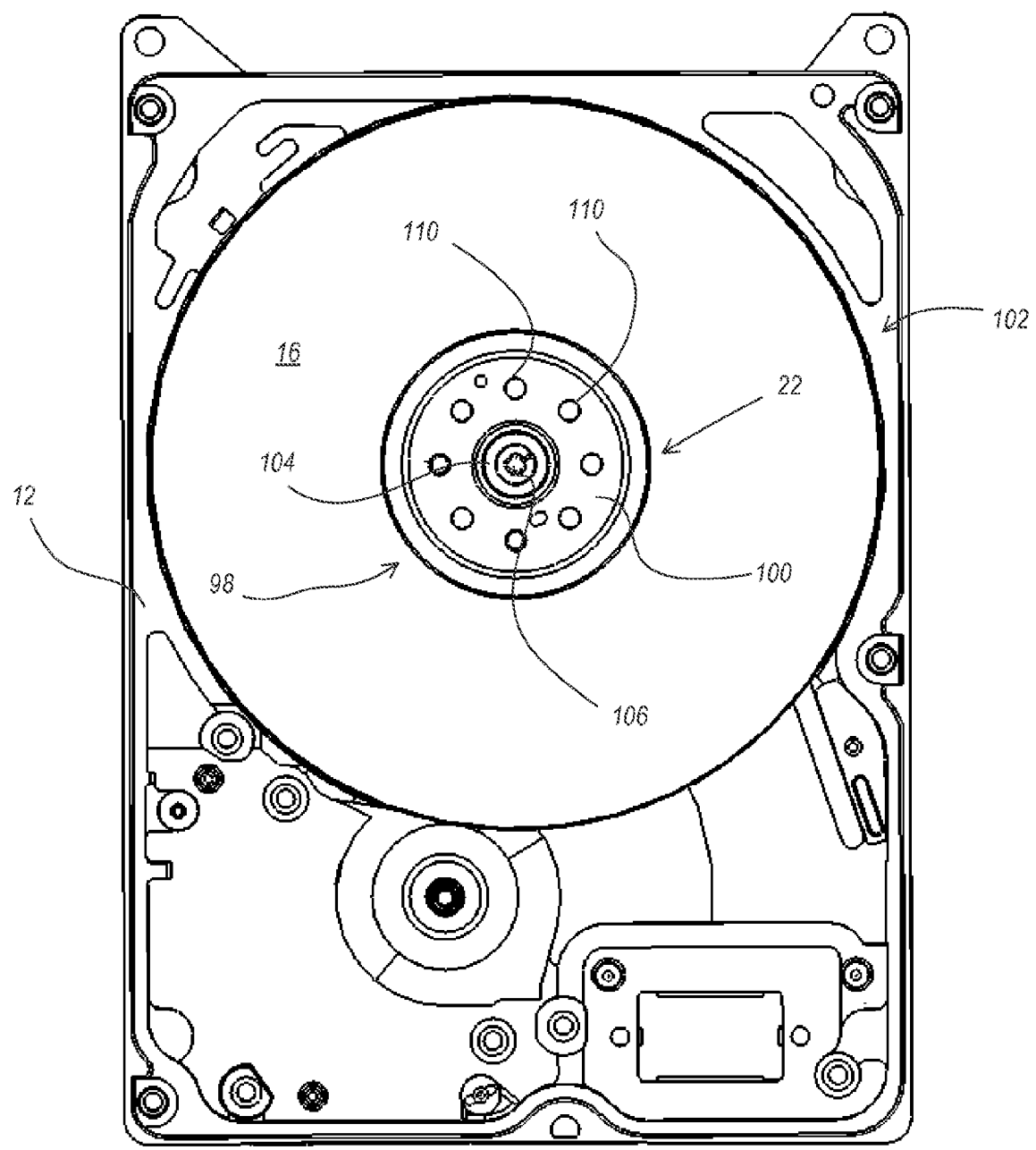
FIG. 2 illustrates a top view of a disk drive in accordance with one embodiment.

Each disk 16 is mounted on a rotatable hub 98 connected to the spindle motor 22 and is secured to the rotatable hub by a disk clamp 100, as illustrated in FIG. 2. Some disk drives 10 include a plurality of disks 16 to provide additional disk surface for storing greater amounts of data. The resulting combination is referred to herein as a motor/disk assembly or as a disk pack 102.

Multiple data storage disks 16 can be mounted on the rotatable hub 98 in vertically and substantially equally spaced relations. One or more bearings 104 are disposed between a motor or spindle shaft 106 and the rotatable hub 98, which is disposed about and rotatable relative to the spindle shaft 106. Electromagnetic forces are used to rotate the hub 98 about the stationary shaft 106 at a desired velocity. Rotational movement of the hub 98 is translated to each of the disks 16 of the disk pack 102, causing the disks 16 to rotate with the hub 98 about the shaft 106.

The disks 16 are rotated about the shaft 106 at a high rate of speed, and consumer demand for quicker data retrieval can result in increased rotational speed of the hub 98 and the disks 16 to provide reduced time in accessing data. Even minor imbalances of the rotating motor/disk assembly 102 can generate significant forces that can adversely affect the ability to accurately position the head 36 relative to the desired track of the corresponding disk 16 while reading from or writing to the disk 16. Excessive imbalance can degrade the disk drive performance not only in terms of read/write errors, but also in terms of seek times. Excessive imbalance may result in an undesirable acoustic signature and may even result in damage or excessive wear to various disk drive components.

The inner diameter 18 of each disk 16 is slightly larger in diameter than an outer periphery of the spindle motor hub, or rotatable hub 98, in order to allow the disks 16 to slip about the spindle motor hub 98 during installation. During assembly, the disks 16 may be positioned in an inexact concentric manner about the spindle motor hub 98. In fact, in some instances, the disks 16 may be intentionally biased against the spindle motor hub 98. This inexact concentric relationship between the disk 16 and the motor hub 98 results in the disk pack 102 becoming imbalanced. This imbalance can be manifest in at least two respects.

First, the rotating mass of each disk 16 results in a centrifugal force radially extending in a direction from the axis of rotation 24 in a plane orthogonal to the axis of rotation 24. This can be referred to as a single plane or "static" imbalance. Second, the same centrifugal force also results in a moment about an axis, extending from the axis of rotation 24, as a result of the coupling of two different planes of imbalance, each of which are orthogonal to the axis of rotation 24. This can referred to as a dual plane, two plane, or "dynamic" imbalance.

Balancing of the disk pack 102 is preferably conducted, for example, by the manufacturer or during an assembly process, prior to shipping the drive 10 to the consumer. Single plane balancing of the disk pack 102 can include attaching one or more weights to one side of the disk pack 102. Not all imbalances may be alleviated to the desired degree by balancing within a single plane. Dual plane balancing of the disk pack 102 can be achieved by attaching one or more weights at two different elevations along the axis 24 corresponding with vertically spaced reference planes in an attempt to improve upon the potential inadequacies of a single plane balance.

Balancing the disk pack 102 can be accomplished by attaching one or more weights to a central portion of the disk pack 102. For example, as illustrated in FIG. 2, the disk pack 102 can have a portion that holds the one or more weights or to which the one or more weights attach. FIG. 2 illustrates a disk pack 102 having a rotatable hub 98 that includes a disk clamp 100 having a plurality of disk clamp apertures 110 positioned circumferentially about a central portion of the disk pack 102.

The disk clamp apertures 110 can be, as illustrated in FIG. 2, substantially equidistant from, or equally spaced about, the axis of rotation 24. For example, a plurality of the disk clamp apertures 110 can be positioned about the axis of rotation 24 on a common reference circle having its center coinciding with the axis of rotation 24. The plurality of disk clamp apertures 110 can also include apertures that are positioned at different radial distances from the axis of rotation 24 than others of the plurality of disk clamp apertures.

In one embodiment, the disk clamp 100 includes eight disk clamp apertures 110 that are positioned about the axis of rotation 24. The disk clamp 100 can include between about four disk clamp apertures 110 and about eight disk clamp apertures 110. In one embodiment, the disk clamp 100 can include less than four disk clamp apertures 110, and in some embodiments, the disk clamp 100 can include more than eight disk clamp apertures 110.

The disk clamp apertures 110 can be designed to be substantially the same size, and in some embodiments, the disk clamp apertures 110 can be designed to have apertures of different sizes. The different sized apertures can be positioned with different radial distances as apertures of different sizes, or the different sized apertures can be positioned with equal radial distances from the axis of rotation than apertures of different sizes.

When balancing the disk pack 102, one or more weights can be placed within one or more of the disk clamp apertures 110 in order to stabilize the disk pack 102 during operation. One or more weights can be used to offset imbalances that are generated during operation of the disk drive 10. For example, if imbalances are created by rotational movement of the disk pack 102 during operation of the disk drive 10, one or more weights can be placed within disk clamp apertures 110 in order to offset the imbalance created by rotational movement of the disk pack 102.

Figure 3:
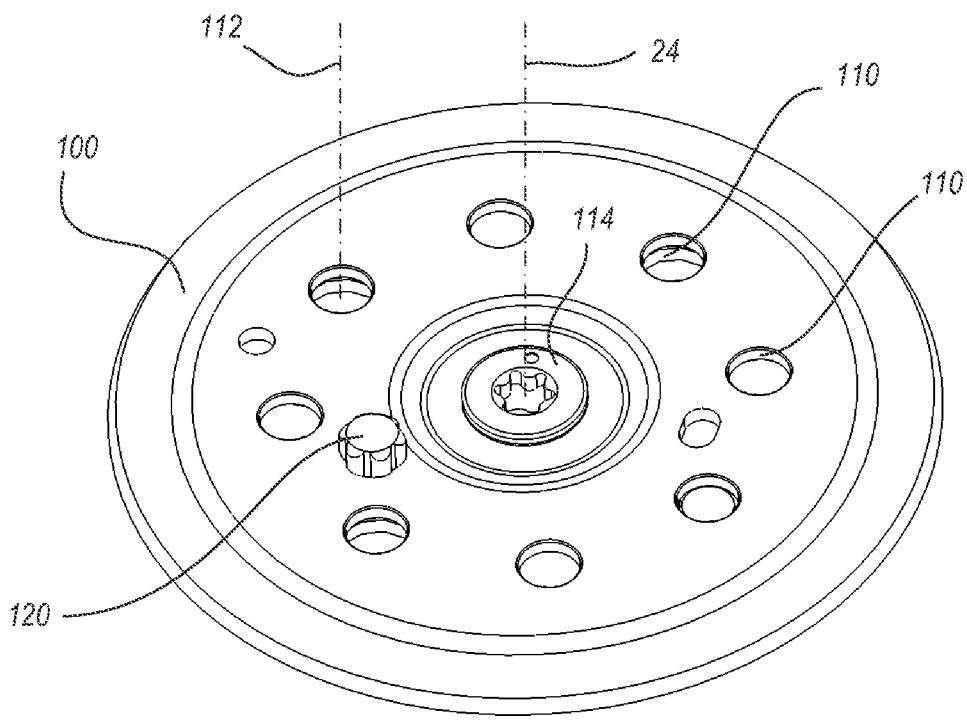
FIG. 3 illustrates a perspective view of a disk clamp in accordance with one embodiment.

FIG. 3 illustrates a partially exploded view that includes a disk clamp 100 that can be positioned on a disk pack 102 that includes one or more disks 16. As explained, the disk clamp 100 can include a plurality of disk clamp apertures 110 positioned about the axis of rotation 24. As depicted in FIG. 3, the disk clamp apertures 110 can be positioned with substantially equal radial distances from the axis of rotation 24, such that the disk clamp apertures 110 are positioned along a common reference circle that has its center substantially coinciding with the axis of rotation 24.

Each of the disk clamp apertures 110 defines a disk clamp aperture axis 112 that extends substantially through the respective disk clamp aperture 110. The disk clamp aperture axis 112 of each of the respective disk clamp apertures 110 can be substantially parallel to the axis of rotation 24. In some embodiments, the disk clamp aperture axis 112, of one or more of the disk clamp apertures 110 can be positioned at angles relative to the axis of rotation 24. For example, in some embodiments, the disk clamp aperture axis 112 can be positioned at an angle of between about 20° to about 80° relative to the axis of rotation 24, and in some embodiments, the disk clamp aperture axis 112 can be positioned at an angle of between about 30° to about 50° relative to the axis of rotation 24.

In one embodiment, the disk clamp apertures 110 are positioned symmetrically about the axis of rotation 24. In some embodiments, the disk clamp 100 can include disk clamp apertures 110 that are positioned asymmetrically about the axis of rotation 24. And in some embodiments, the disk clamp 100 can include some disk clamp apertures 110 that are symmetrically about the axis of rotation 24 and other disk clamp apertures 110 that are positioned asymmetrically about the axis of rotation 24.

A fastener 114 can be provided to secure the disk clamp 100 to the disk pack 102. As illustrated in FIG. 3, the fastener 114 can be positioned to be substantially aligned with the axis of rotation 24. The fastener 114 is preferably threadingly received by an internal bore in the shaft 106.

FIG. 3 depicts a balance plug 120 that can be positioned in one or more of the disk clamp apertures 110 to balance the disk pack 102. As illustrated, the balance plug 120 is configured to be sized such that it can be received within, and preferably through, the disk clamp aperture 110. Although FIG. 3 depicts only one balance plug 120 being received within a disk clamp aperture 110, the disk pack 102 can include a plurality of balance plugs 120 that are received into at least one of the disk clamp apertures 110.

Figure 4:
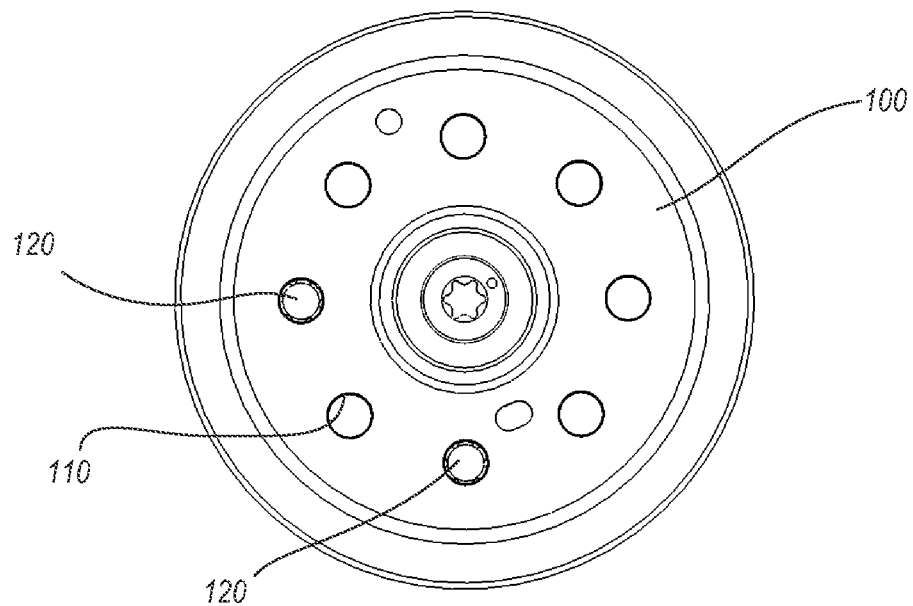
FIG. 4 illustrates a top view of a disk clamp in accordance with one embodiment.

FIG. 4 illustrates a top view of the disk clamp 100 with a plurality of balance plugs 120 residing within a plurality of disk clamp apertures 110. As illustrated in the embodiment depicted in FIG. 4, the disk clamp 100 can include a plurality of disk clamp apertures 110 that are positioned in symmetrical fashion about a central portion of the disk clamp 100. While the disk clamp apertures 110 are positioned in symmetrical fashion, positioning of the balance plugs 120 within select disk clamp apertures 110 do not need to be symmetrical.

Figure 5:
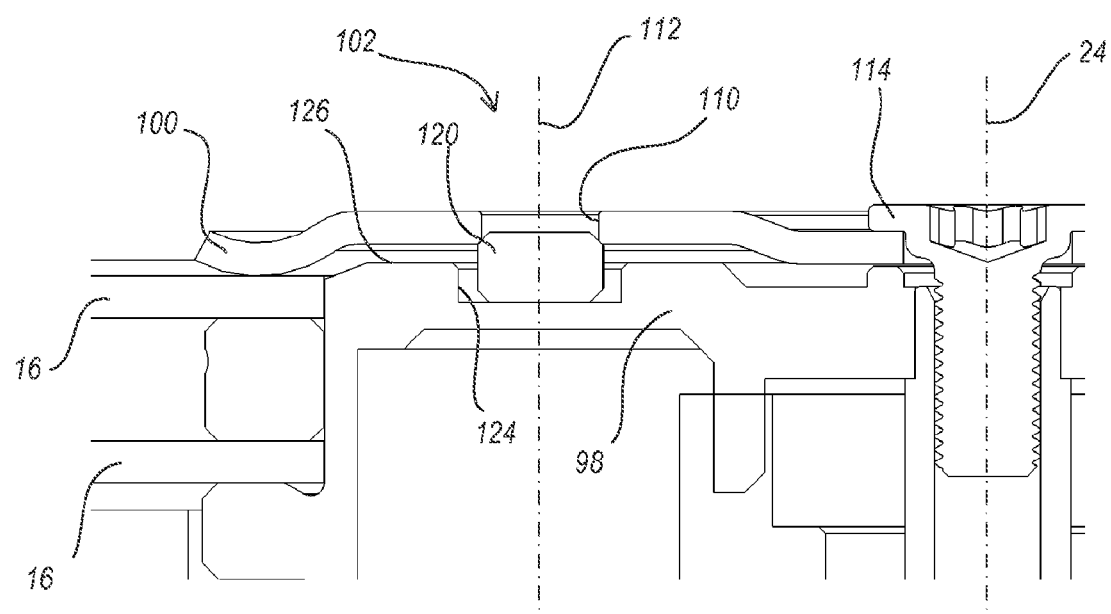
FIG. 5 illustrates a partial cross-sectional view of a disk pack in accordance with one embodiment.

FIG. 5 illustrates a partial cross-sectional view of a portion of the disk pack 102 that includes a rotatable motor hub 98 and a motor or spindle shaft 106 positioned about an axis of rotation 24. The disk at 102 can include a plurality of disks 16 that are secured in position by a disk clamp 100. The disk clamp 100 can include a plurality of disk clamp apertures 110 that are positioned about the disk clamp 100 at a radial distance from the axis of rotation 24.

A motor hub recess 124 can extend from a top surface 126 of the motor hub 98. As illustrated, in one embodiment, the motor hub recess 124 extends into the motor hub 98 but does not extend to a bottom surface 128 of the motor hub 98. The motor hub 98 can include a plurality of motor hub recesses 124 that are positioned about the axis of rotation.

In one embodiment, each of the plurality of motor hub recesses 124 is positioned about the axis of partition 24 at a radial distance that is substantially the same as others of the plurality of motor hub recesses 124. The motor hub recesses 124 can be positioned symmetrically about the axis of rotation, and in some embodiments, the motor hub 98 can include motor hub recesses 124 that are positioned asymmetrically about the axis of rotation 24. The motor hub recesses 124 can be positioned about the axis of rotation 24 such that each of the motor hub recesses 124 is aligned along a common reference circle cutting its center substantially coinciding with the axis of rotation 24. In some embodiments, the motor hub recess 124 can extend into the motor hub 98 in a direction that is substantially parallel to the axis of rotation 24.

As illustrated in FIG. 5, disk clamp 100 is preferably positioned rotationally about the axis of rotation 24 such that at least one disk clamp aperture 110 is substantially aligned with at least one motor hub recess 124. In some embodiments, this orientation will permit receipt of a balance plug 120 into at least a portion of the motor hub recess 124 through the disk clamp aperture 110.

In one embodiment, at least one of the motor hub recess 124 and the disk clamp aperture 110 includes a cross-sectional dimension that is less than a cross-sectional dimension of the balance plug 120. For example, in one embodiment, the motor hub recess 124 can include a cross-sectional dimension, which can be a diameter of the recess 124, that is less than a cross-sectional dimension, which can be a diameter, of the balance plug 120. In another example, in one embodiment, the disk clamp aperture 110 can include a cross-sectional dimension, which can be a diameter of the aperture 110, that is less than a cross-sectional dimension, which can be a diameter, of the balance plug 120.

Accordingly, in some embodiments, when the balance plug 120 is received into the disk clamp aperture 110, and in some embodiments into the motor hub recess 124, the balance plug 120 engages at least one of the disk clamp aperture 110 and the motor hub recess 124. In some embodiments, at least a portion of the balance plug 120 is compressed or deformed, plastically or elastically, when received into the disk clamp aperture 110, or when residing within the motor hub recess 124.

Figure 6:
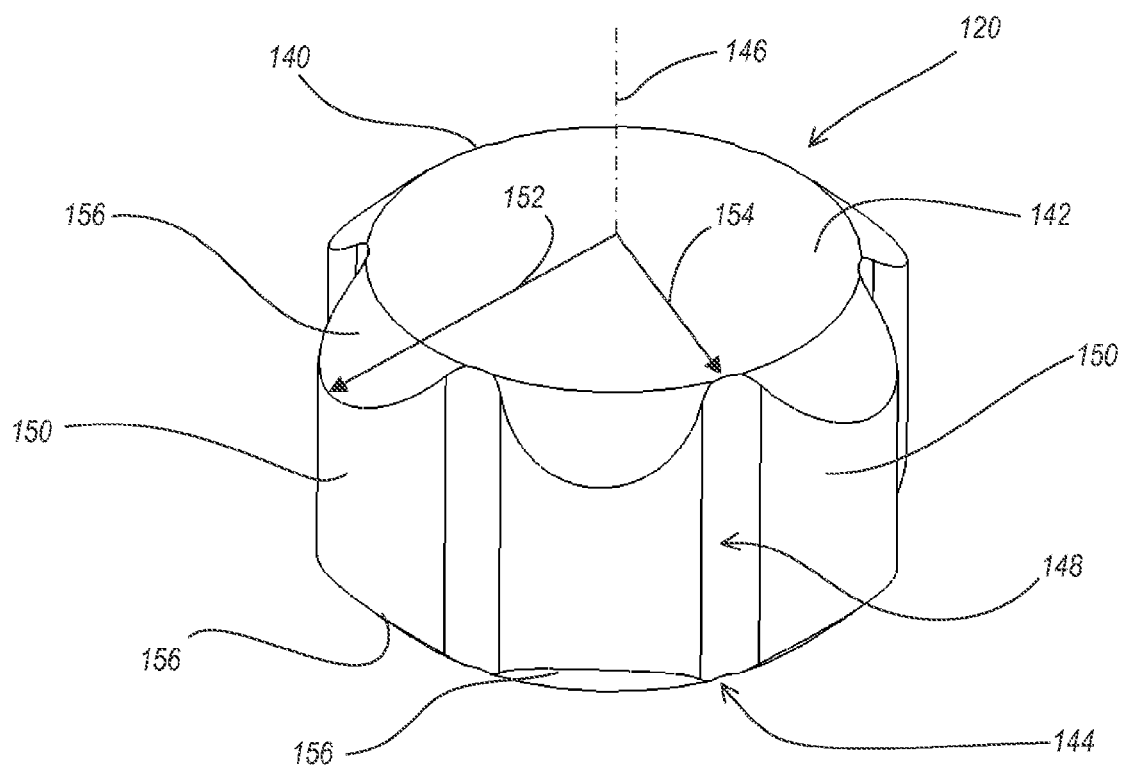
FIG. 6 illustrates one embodiment of a balance plug.

FIG. 6 illustrates one embodiment of the balance plug 120 that can be used in connection with embodiments described in this disclosure. The balance plug 120 preferably includes a cylindrical body 140 that defines a top surface 142 and a bottom surface 144. The cylindrical body 140 also defines a cylindrical body axis 146 that extends through a substantially central portion of the balance plug 120. Extending about a periphery of the cylindrical body 140 is an outer surface 148. Also extending about the outer surface 148 of the cylindrical body 141 is at least one longitudinal retainer 150 that extends in a direction between the top surface 142 in the bottom surface 144.

In one embodiment, the at least one longitudinal retainer 150 extends in a direction along the outer surface 148 that is substantially aligned with the body axis 146. In one embodiment, the direction that the at least one longitudinal retainer 150 extends along the outer surface 148 is substantially parallel to the body axis 146. In some embodiments, the balance plug 120 can include a plurality of longitudinal retainers 150 that extend about the outer surface 148 of the cylindrical body 140.

The longitudinal retainer 150 preferably extends in an outward direction from the outer surface 148 such that a cross-sectional dimension of the longitudinal retainer 150 and the cylindrical body 140 is greater than a cross-sectional dimension of the cylindrical body 140 alone. For example, the longitudinal retainer 150 can have a greater radial distance 152 that extends from the body axis 146 to an outer surface of the longitudinal retainer 150 than a radial distance 154 that extends from the body axis 146 to the outer surface 148 of the cylindrical body 140.

In one embodiment, the balance plug 120 is received within the disk clamp aperture 110 by deforming a portion of the balance plug 120. Insertion of the balance plug 120 can further be facilitated by providing one or more chamfers 156 on the longitudinal retainer 150. For example, the longitudinal retainer 150 can include a chamfer 156, where the longitudinal retainer 150 meets at least one of the top surface 142 in the bottom surface 144 of the cylindrical body 140. In one embodiment, illustrated in FIG. 5, is received to the disk clamp aperture 110. A portion of the disk clamp aperture 110 can engage to chamfer 150. This configuration can limit the movement of the balance plug 120 within at least one of the disk clamp aperture 110 and the motor hub recess 124 and can further secure the balance plug 120 against an inadvertent dislodging of the balance plug 120 from its desired location or positioning within the disk pack 102.

In some embodiments, the disk pack 102 can have balance plugs 120 that all have the same or substantially the same mass. In some embodiments, the disk pack 102 can have balance plugs 120 of different sizes and/or of different mass. For example, in some embodiments, the balance plugs 120 can have the same size and have different masses that can be determined based on the desired effect that will be created when inserted into the disk pack 102. As another example, the balance plugs 120 can have different sizes and have the same mass, which can also be determined based on how the plug 120 will affect performance of the disk pack 102. In yet another example, the balance plugs 120 can be of differing sizes and differing masses.

In one embodiment, the disk drive 10 can include a spindle hub 98 having a top surface 126. The drive can also include a disk clamp 100, coupled to the spindle hub 98, and the disk clamp 100 can have a balance plug, or disk clamp, aperture 110 that is positioned substantially over the top surface 126 of the spindle hub 98 such that the plug aperture 110 defines an aperture axis 112 that extends through the plug aperture 110 and the top surface 126. The drive 10 can also include a substantially cylindrical balance plug 120. In one embodiment, the balance plug 120 includes opposing ends 142, 144 and a substantially cylindrical outer surface 148 that defines a central axis 146 of the plug 120. The plug 120 can also have a protrusion 150 along the cylindrical outer surface 148 that extends between the opposing ends 142, 144 in a direction substantially aligned with the central axis 146. The plug 120 is preferably sized and configured to be received through the plug aperture 110.

In one embodiment, the top surface further includes at least one plug recess 124 that is configured to receive at least a portion of the balance plug 120 when the balance plug is received through the plug aperture 110. In some embodiments, the plug is sized such that the opposing ends of the plug are positioned below a top surface of the disk clamp 100 when the plug is received through the plug aperture 110. The plug 120 is sized, in some embodiments, such that, when the plug 120 is positioned through the plug aperture 110, the transitional chamber 156 engages a bottom portion of the disk clamp 100. Some embodiments provide that the plug includes a transitional chamfer 156 between the protrusion and at least one of the opposing ends.

In one embodiment of the balance plug 120, the protrusion, or longitudinal retainer 150, is substantially parallel to the body, or central, axis 146. In one embodiment, the protrusion 150 includes a continuous portion extending between the opposing ends of the plug 120. In some embodiments, the protrusion 150 can be segmented or extends only partially between the opposing ends 142, 144 of the plug 120.

Some embodiments provide that the plug 120 consists of a single, uniform material. In some embodiments, this single uniform material is a polymer. In other embodiments, the plug 120 can be made of a plurality of materials. For example, the plug 120 can, in some embodiments, have a metal that forms the cylindrical body 140 and have a polymer overmolded, over the metal, to form the protrusions, or longitudinal retainers 150. In some embodiments, the plug can be manufactured such that the material of the cylindrical body 140 and the material of one or more protrusions 150 have differing moduli of elasticity. In another example, the plug 120 can be made of two different polymers, and a polymer with a higher modulus of elasticity can form the cylindrical body 140, while a polymer having a lower modulus of elasticity can form one or more protrusions 150. In yet another example, the plug 120 can have a polymer with a lower modulus of elasticity form the cylindrical body 140, and a polymer with a higher modulus of elasticity form one or more protrusions 150.

Some embodiments provide that the balance plug can include a substantially cylindrical body defining a first end, a second end, a substantially cylindrical outer surface, and a plug central axis. In some embodiments, the plug also includes at least one protrusion that extends along the cylindrical outer surface between the first and second ends in a direction substantially aligned with the plug central axis.

Some embodiments provide a method of balancing a disk pack in a disk drive that can include the steps of providing a disk drive having a spindle hub 98 with a top surface 126 and providing a disk clamp 100 having a balance plug aperture 110 positioned substantially over the top surface 126 of the spindle hub 98 such that the plug aperture 110 defines an aperture axis 112 that extends through a portion of the top surface 126 and the plug aperture 110. The method further includes providing a substantially cylindrical balance plug 120 having opposing ends 142, 144 and a substantially cylindrical outer surface 148 that defines a central axis 146 of the plug 120 and advancing the plug through the plug aperture 110. In some embodiments, the plug is retained between the disk clamp 100 and the spindle hub 98 by a protrusion 150 along the cylindrical outer surface of the plug 120, and the protrusion preferably extends between the opposing ends in a direction substantially aligned with the central axis.

The method can further provide that the top surface of the spindle hub includes a recess that receives a portion of the plug when the plug is advanced through the plug aperture. The method may also include advancing a plurality of balance plugs through the disk clamp.

The description of the invention is provided to enable any person skilled in the art to practice the various embodiments described herein. While the embodiments have been particularly described with reference to the various figures and disclosure, it should be understood that these are for illustration purposes only and should not be taken as limiting the scope of the inventions.

There may be many other ways to implement the embodiments. Various functions and elements described herein may be partitioned differently from those shown without departing from the spirit and scope of the disclosure. Various modifications to these embodiments will be readily apparent to those skilled in the art, and generic principles defined herein may be applied to other embodiments. Thus, many changes and modifications may be made to embodiments, by one having ordinary skill in the art, without departing from the spirit and scope of the disclosure.

A reference to an element in the singular is not intended to mean "one and only one" unless specifically stated, but rather "one or more." The term "some" refers to one or more. Any headings and subheadings are used for convenience only, do not limit the disclosure, and are not referred to in connection with the interpretation of the description of the disclosure. All structural and functional equivalents to the elements of the various embodiments described throughout this disclosure that are known or later come to be known to those of ordinary skill in the art are expressly incorporated herein by reference and intended to be encompassed by the disclosure. Moreover, nothing disclosed herein is intended to be dedicated to the public regardless of whether such disclosure is explicitly recited in the above description.

What is claimed is:

1. A balance plug of a disk drive, the balance plug comprising:
   a substantially cylindrical body defining a first end, a second end, a substantially cylindrical outer surface, and a plug central axis; and
   a protrusion extending along the cylindrical outer surface between the first and second ends in a direction substantially aligned with the plug central axis,
   wherein the balance plug is sized and configured to be inserted into a portion of the disk drive; and
   wherein the protrusion is configured to engage the portion of the disk drive and retain the balance plug in the portion of the disk drive.

2. The plug of claim 1, wherein the protrusion is substantially parallel to the central axis of the plug.

3. The plug of claim 1, wherein the plug comprises a transitional chamfer between the protrusion and at least one of the first and second ends.

4. The plug of claim 1, wherein the protrusion comprises a continuous portion extending between the first and second ends of the plug.

5. The plug of claim 1, wherein the plug comprises a uniform material.

6. The plug of claim 1, wherein the material comprises a polymer.

7. The plug of claim 1, wherein the plug comprises a plurality of protrusions positioned about the cylindrical outer surface, each of the plurality of protrusions having a radial dimension from the central axis that is greater than a radial dimension of the substantially cylindrical surface of the plug.

8. The plug of claim 1, wherein the plug comprises from two to six protrusions positioned about the cylindrical outer surface.

9. The plug of claim 1, wherein the plug comprises a plurality of materials.

10. The plug of claim 9, wherein the protrusion comprises a material having a different modulus of elasticity than other materials of the balance plug.

* * * * *